(12) United States Patent
Ishikawa et al.

(10) Patent No.: US 7,040,806 B2
(45) Date of Patent: May 9, 2006

(54) TEMPERATURE DETECTING UNIT AND FIXING APPARATUS

(75) Inventors: Chuji Ishikawa, Yokohama (JP); Hidenori Itoh, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/618,587

(22) Filed: Jul. 15, 2003

(65) Prior Publication Data

US 2004/0057493 A1    Mar. 25, 2004

(30) Foreign Application Priority Data

Jul. 15, 2002   (JP)   ............... 2002-205840

(51) Int. Cl.
G01K 1/08   (2006.01)
G01K 1/16   (2006.01)
G01J 5/06   (2006.01)

(52) U.S. Cl. ............... 374/120; 374/208; 374/130; 374/121; 250/338.1

(58) Field of Classification Search ............ 374/120, 374/121, 130, 179, 208; 250/339.11, 339.14, 250/338.1, 338.3, 352, 363.01
See application file for complete search history.

(56) References Cited

U.S. PATENT DOCUMENTS

| | | | |
|---|---|---|---|
| 3,874,286 A | 4/1975 | Ishikawa | |
| 4,018,154 A | 4/1977 | Matsumoto et al. | |
| 4,257,054 A | 3/1981 | Ishikawa | |
| 4,258,372 A | 3/1981 | Ishikawa | |
| 4,286,134 A * | 8/1981 | Nakata et al. | ......... 219/711 |
| 4,430,658 A | 2/1984 | Fukazawa et al. | |
| 4,437,101 A | 3/1984 | Ebi et al. | |
| 4,461,941 A * | 7/1984 | Fukuda et al. | ......... 219/711 |
| 4,502,055 A | 2/1985 | Horike et al. | |
| 4,516,027 A * | 5/1985 | Schimmelpfennig et al. | ......... 250/338.3 |
| 4,520,367 A | 5/1985 | Ishikawa et al. | |
| 4,611,216 A | 9/1986 | Ishikawa et al. | |
| 4,628,331 A | 12/1986 | Ishikawa | |
| 4,630,814 A | 12/1986 | Kawakubo et al. | |
| 4,672,390 A | 6/1987 | Ishikawa | |
| 4,739,347 A | 4/1988 | Ishikawa et al. | |
| 4,800,398 A | 1/1989 | Naruse et al. | |
| 4,847,631 A | 7/1989 | Naruse et al. | |
| 4,851,682 A * | 7/1989 | Moriyama et al. | ......... 250/338.3 |
| 5,085,090 A | 2/1992 | Sugasawa et al. | |
| 5,132,740 A | 7/1992 | Okamoto et al. | |
| 5,323,005 A * | 6/1994 | Merkel | ......... 250/338.1 |
| 5,426,495 A | 6/1995 | Sawamura et al. | |
| 5,603,871 A | 2/1997 | Koseko et al. | |
| 5,645,349 A * | 7/1997 | Fraden | ......... 374/120 |
| 5,832,354 A | 11/1998 | Kouno et al. | |
| 5,865,880 A * | 2/1999 | Matsui | ......... 96/26 |
| 5,915,147 A | 6/1999 | Kouno et al. | |

(Continued)

FOREIGN PATENT DOCUMENTS

JP    01032131 A   *   2/1989

(Continued)

Primary Examiner—Gail Verbitsky
(74) Attorney, Agent, or Firm—Oblon, Spivak, McClelland, Maier & Neustadt, P.C.

(57) ABSTRACT

A temperature detecting unit including a temperature detecting sensor, a window member, and a frame which holds the window member. The temperature detecting sensor receives infrared rays radiated by an object, thereby detecting the temperature of the object without contact with the object. The window member is arranged between the object and the temperature detecting sensor, and transmits the infrared rays. The window member includes a surface with a fluorination organic compound.

20 Claims, 16 Drawing Sheets

U.S. PATENT DOCUMENTS

| | | | |
|---|---|---|---|
| 5,999,789 A | 12/1999 | Sawamura | |
| 6,064,056 A * | 5/2000 | Doak | 250/223 R |
| 6,121,596 A * | 9/2000 | Taino et al. | 219/711 |
| 6,152,595 A * | 11/2000 | Beerwerth et al. | 374/131 |
| 6,169,871 B1 | 1/2001 | Higaya | |
| 6,236,046 B1 * | 5/2001 | Watabe et al. | 250/338.1 |
| 6,255,632 B1 | 7/2001 | Yokoyama et al. | |
| 6,261,694 B1 * | 7/2001 | Iacovangelo | 428/412 |
| 6,340,810 B1 | 1/2002 | Yokoyama et al. | |
| 6,397,615 B1 * | 6/2002 | Kawai et al. | 62/244 |
| 6,435,711 B1 * | 8/2002 | Gerlitz | 374/130 |
| 6,566,630 B1 * | 5/2003 | Kitamura | 219/390 |
| 6,595,907 B1 | 7/2003 | Ishikawa et al. | |
| 6,624,944 B1 * | 9/2003 | Wallace et al. | 359/580 |
| 6,626,835 B1 * | 9/2003 | Kraus | 600/454 |
| 6,630,655 B1 * | 10/2003 | Fukunaga et al. | 219/711 |
| 6,636,753 B1 * | 10/2003 | Braig et al. | 600/310 |
| 6,684,037 B1 * | 1/2004 | Tamaoki | 399/69 |
| 6,755,031 B1 * | 6/2004 | Cho et al. | 62/126 |
| 6,781,946 B1 * | 8/2004 | Murata et al. | 369/112.23 |
| 2003/0118076 A1 * | 6/2003 | Schieferdecker et al. | 374/121 |
| 2003/0222218 A1 * | 12/2003 | Nozu | 250/338.1 |
| 2004/0017443 A1 * | 1/2004 | Ikeda et al. | 347/84 |
| 2004/0031924 A1 * | 2/2004 | Cho et al. | 250/353 |
| 2004/0066832 A1 * | 4/2004 | Lin et al. | 374/120 |
| 2004/0109490 A1 * | 6/2004 | Asakura et al. | 374/133 |
| 2004/0149910 A1 * | 8/2004 | Hatatani et al. | 250/338.3 |
| 2004/0151229 A1 * | 8/2004 | Ruettiger | 374/121 |

FOREIGN PATENT DOCUMENTS

| | | | |
|---|---|---|---|
| JP | 05052649 A | * | 3/1993 |
| JP | 10318542 A | * | 12/1998 |

* cited by examiner

TEMPERATURE DETECTING UNIT AND FIXING APPARATUS

BACKGROUND OF THE INVENTION

1. Field of the Invention

The present invention. relates to a temperature detecting unit for detecting the temperature of an object without contacting the object and a fixing apparatus.

2. Description of Related Art

There is a conventional temperature detecting device for detecting the temperature of the object without contacting the object. The temperature detecting device includes a temperature detecting sensor which receives infrared rays radiated by the object, which thereby detects the temperature of the object without contact, and a window member, which is arranged between the object and the temperature detecting sensor and which transmits the infrared rays.

However the conventional temperature detecting device does not solve all of the problems presented during use in a fixing apparatus, an electric heating cooking device, or an air conditioner.

SUMMARY OF THE INVENTION

The present invention advantageously provides a temperature detecting unit that precisely detects the temperature of the object.

The present invention further advantageously provides a fixing apparatus with a temperature detecting unit that precisely detects the temperature of the object.

DETAILED DESCRIPTION OF THE PREFERRED EMBODIMENTS

First Embodiment

Figure 1:
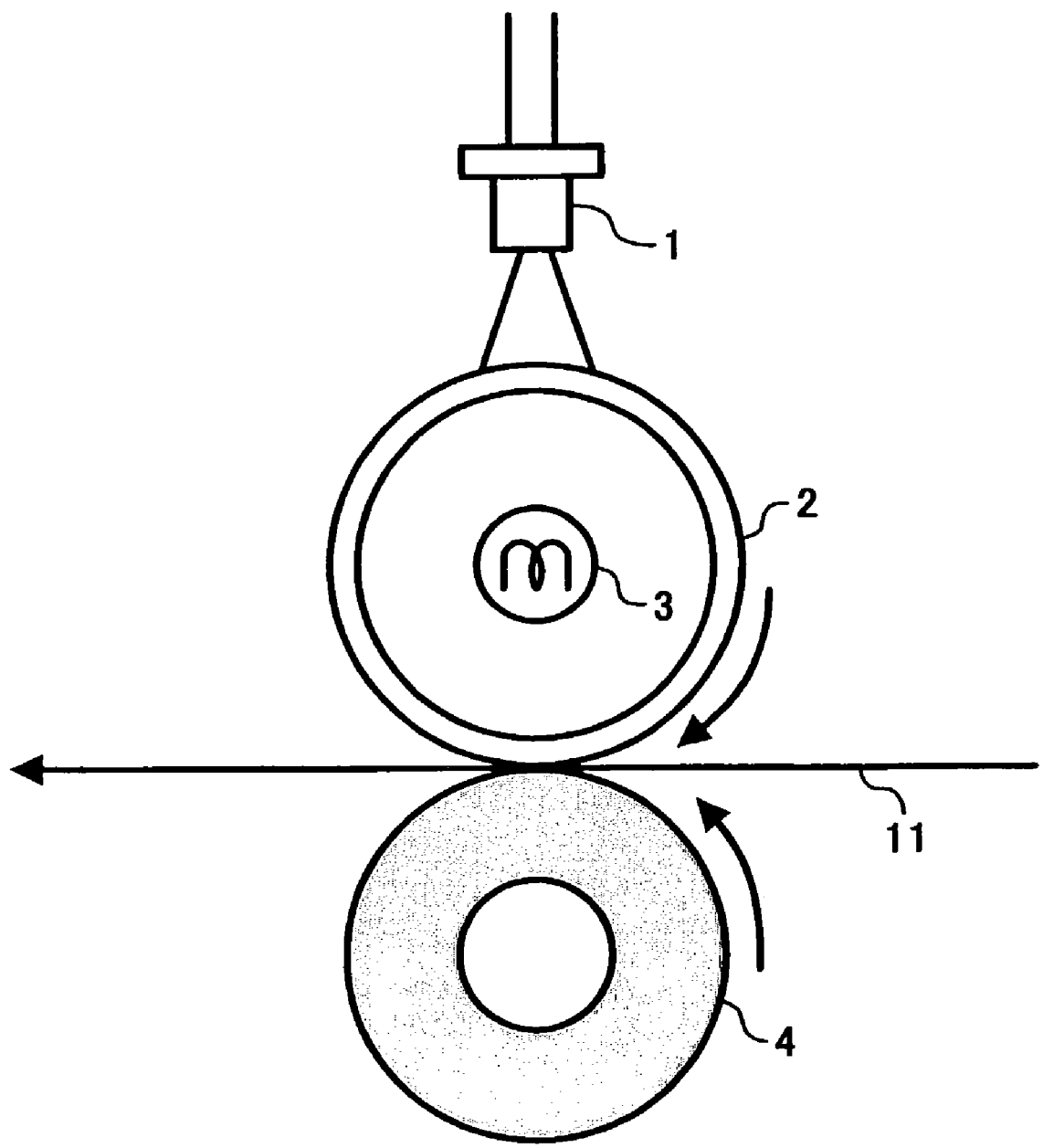
FIG. 1 is a schematic front view showing a fixing apparatus in an image forming apparatus according to the first embodiment of the present invention.

FIG. 1 is a schematic front view showing a fixing apparatus in an image forming apparatus according to the first embodiment of the present invention. The fixing apparatus includes a temperature detecting device 1 as a temperature detecting unit, a fixing roller 2 with a heater 3, and a pressing roller 4 as an opposite member. A nip is formed between the pressing roller 4 and the fixing roller 2, and the pressing roller 4 presses the fixing roller 2. The temperature detecting device 1 receives infrared rays radiated by the surface of the fixing roller 2 as an object, then detects the temperature of the surface of the fixing roller 2 without contacting the fixing roller 2. The controller not illustrated controls the heating value by the heater 3, based on the temperature detected by the fixing roller 2.

Accordingly, a toner image is fixed on a record medium 11 passing through the nip by the heat and the pressure. Further, damage to the surface of the fixing roller by the temperature detecting device 1 is prevented, because the temperature detecting device 1 detects the temperature of the surface of the fixing roller 2 without contacting the fixing roller 2.

Figure 2:
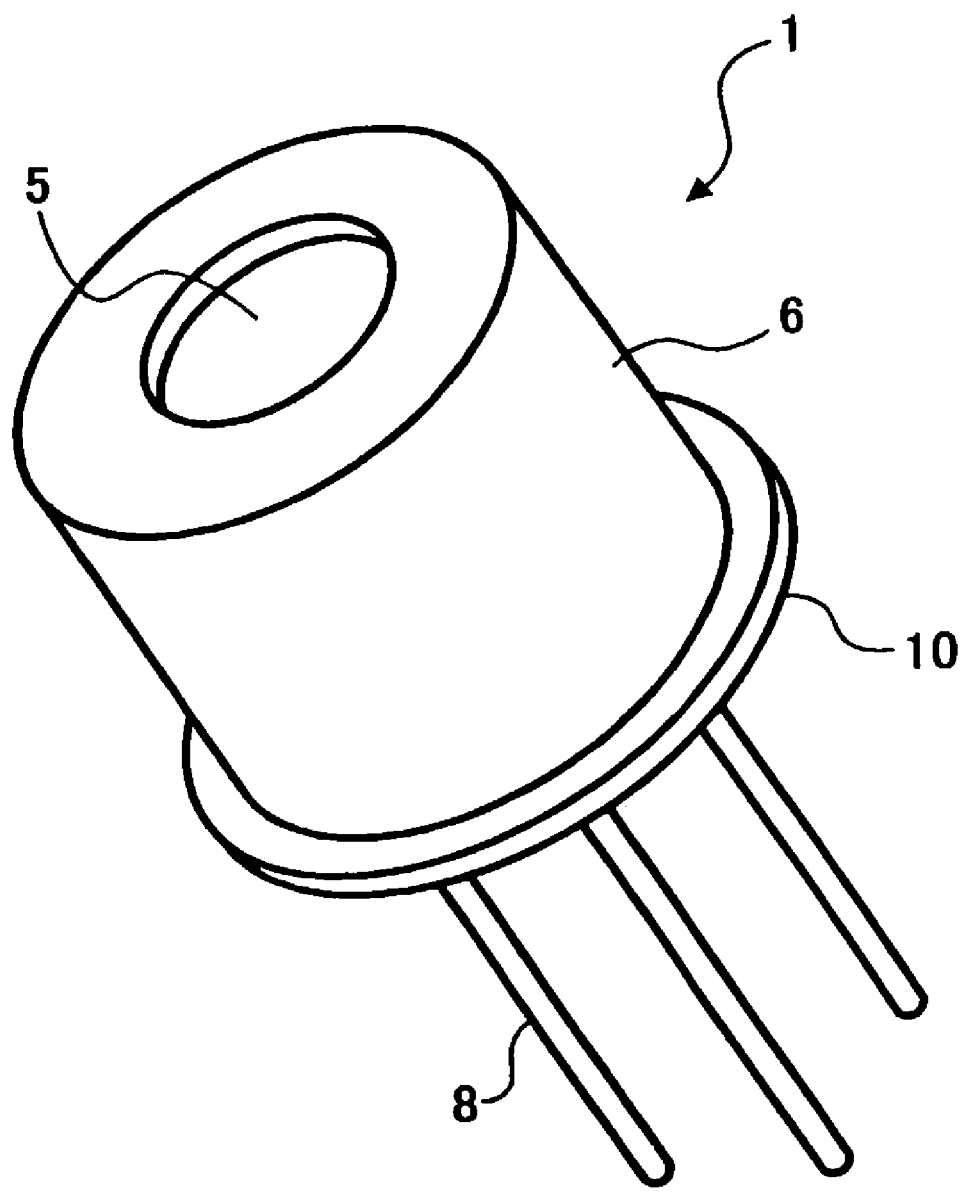
FIG. 2 is a schematic perspective view showing the temperature detecting device 1 of the related art.

FIG. 2 is a schematic perspective view showing the temperature detecting device 1 of the related art. The temperature detecting device 1 includes a frame 5 forming an opening, a can casing 6, a terminal 8, and a bearing surface 10.

Figure 3:
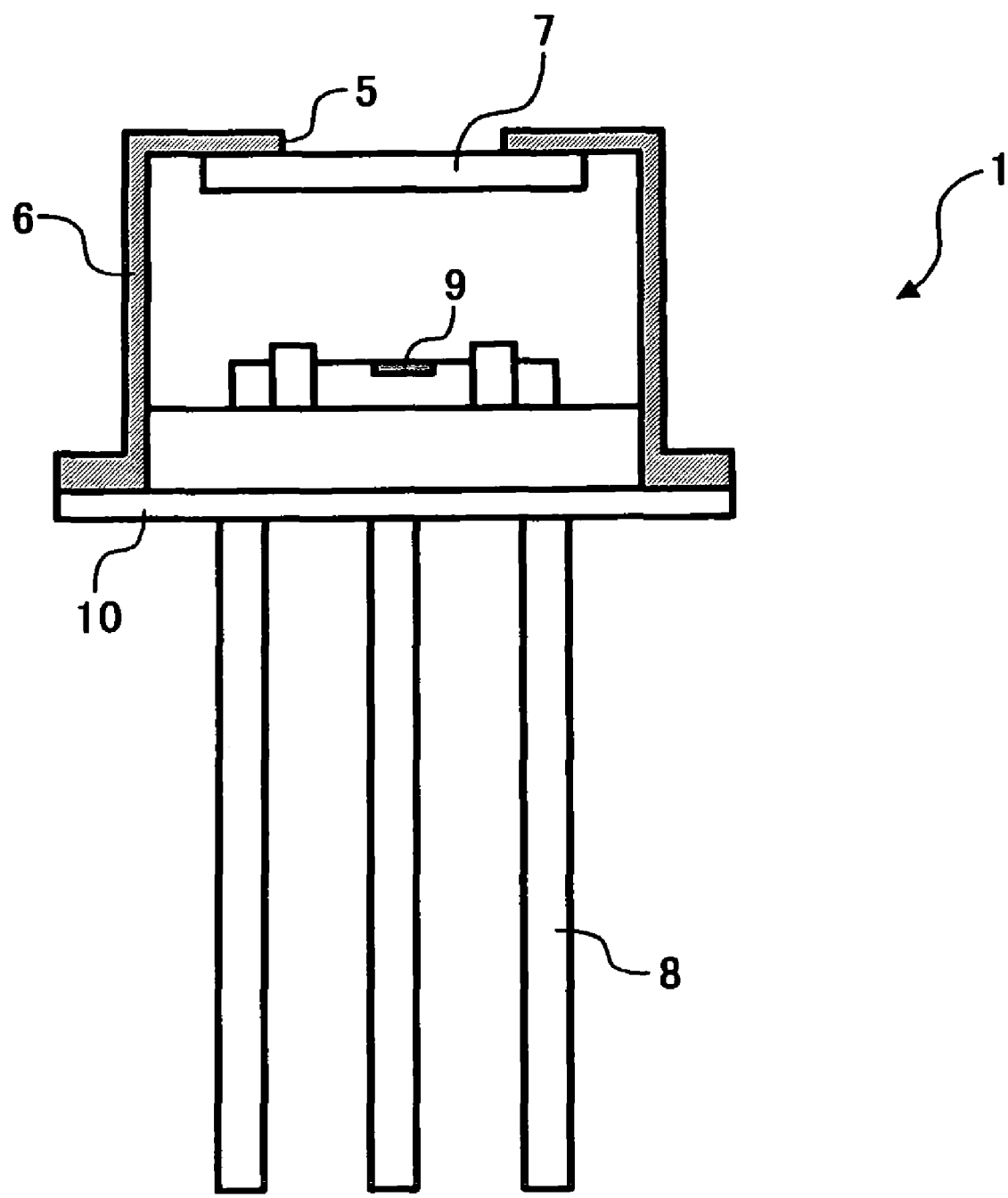
FIG. 3 is a schematic sectional view showing inside the temperature detecting device 1 of the related art.

FIG. 3 is a schematic sectional view showing inside the temperature detecting device 1. The temperature detecting device 1 also includes a window member 7 held by the frame 5, and a thermopile element 9. The window member 7, which is arranged between the object and the thermopile element 9, is formed by a silicon wafer. Thereby the window member 7 transmits the infrared rays by the object.

According to the structure described above, the thermopile element 9 receives infrared rays radiated by the object through the window member 7, then outputs the electric signal according to the infrared rays received through the terminal 8. Thereby the thermopile element 9 detects the temperature of the object as an electric signal without contacting the object.

Further the temperature detecting device 1 can quickly detect the temperature changes of the object by using the thermopile element 9. On the other hand, the output from the thermopile element 9 tends to change by the temperature around the thermopile element 9 according to the following expression.

$$V_{out} = A*(Tb^4 - Ts^4).$$

Vout: the output voltage from the terminal 8.

A: the proportional constant.

Tb: the temperature of the object.

Ts: the temperature of the thermopile element 9.

Accordingly there is preferably arranged a thermistor (not illustrated) to detect the temperature in the temperature detecting device 1. Thereby the output signal from the terminal 8 is compensated by the output signal from the thermistor, then the exact temperature of the object is detected.

Figure 4:
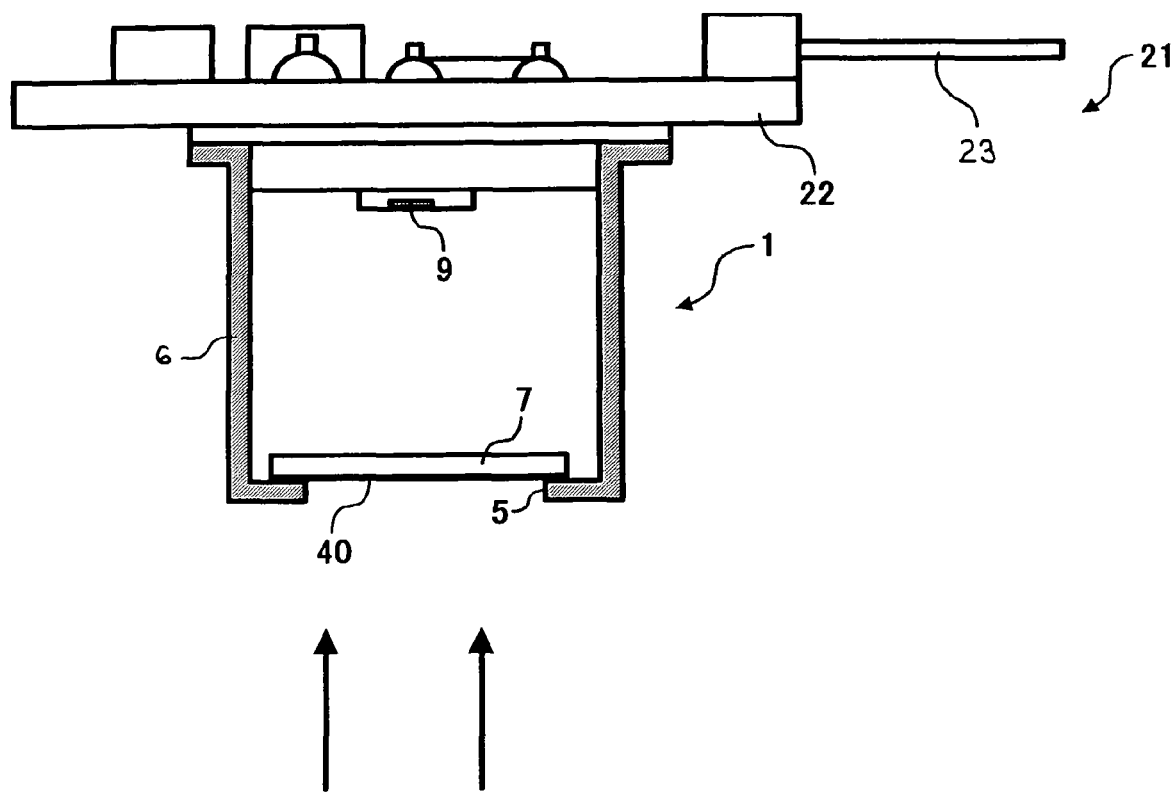
FIG. 4 is a schematic sectional view showing a sensor module 21 of a first embodiment.

FIG. 4 is a schematic sectional view showing a sensor module 21 of the first embodiment. A sensor module 21 includes the temperature detecting device 1, a printed circuit board 22 soldering the terminal 8, and electric and signal wires 23. In this case, the sensor module 21 is called as the temperature detecting unit. The window member 7 includes a plane surface facing the object, which includes a membrane 40 of fluorination organic formed by coating fluorocarbon resin or by spreading oil with the fluorine.

The OPTOOL DSX produced by DAIKIN INDUSTRIES, LTD. is preferably used as the fluorocarbon resin, the DEMNUM Grease produced by DAIKIN INDUSTRIES, LTD. is preferably used as the oil with the fluorine. In this case, the contact angle of water on the membrane 40 is 112 degrees, the friction coefficient on the membrane 40 is 0.13. The surface of the window member 7 may directly include the fluorination organic compound without the membrane 40. The fluorination organic includes the chemical compound used as a lubricant or a water-repellent agent like a tetrafluoroethylene.

According to the structure described above, it is hard to stain the surface of the window member 7 with time, or it is possible to remove stain from the surface of the window member 7 easily, especially on the side facing the object. Thereby the thermopile element 9 can exactly detect the temperature of the object.

Figure 5:
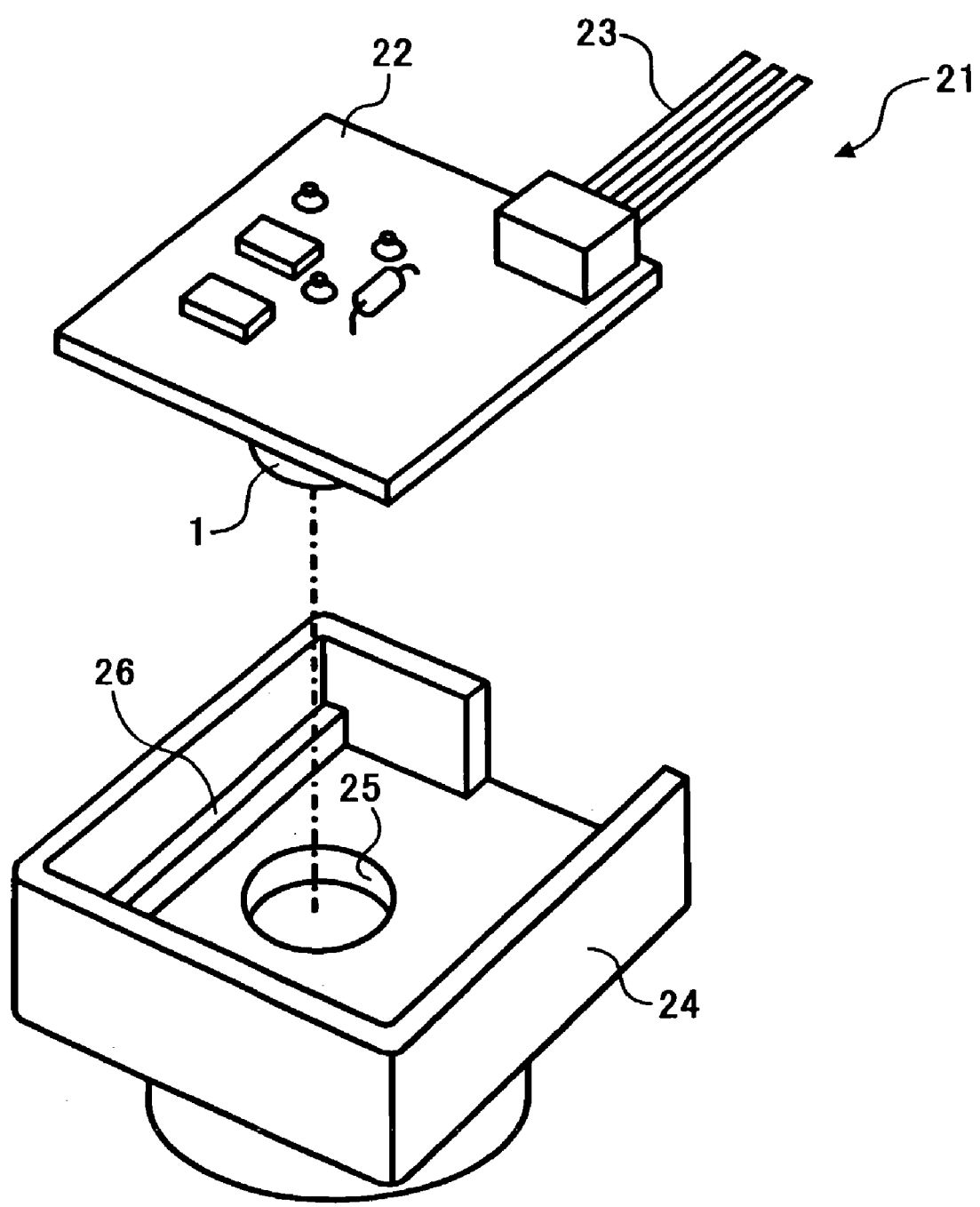
FIG. 5 is a schematic exploded perspective view showing the assembly of a surrounding member 24 and the sensor module 21 of FIG. 4.

FIG. 5 is a schematic exploded perspective view showing the assembly of a surrounding member 24 and the sensor module 21 in the first embodiment. A surrounding member 24 includes a opening 25 and a shelf 26, whose internal dimension is almost same as the external dimensions of the printed circuit board 22. The surrounding member 24 is formed of a heat resistance plastic. The can casing 6 of the temperature detecting device 1 is fitted into the opening 25 while the printed circuit board 22 abuts the shelf 26. Thereby the sensor module 21 fits the surrounding member 24, then the thermopile element 9 is surrounded by the surrounding member 24. In this case, the surrounding member 24 with the sensor module 21 is defined as the temperature detecting unit.

According to the structure described above, it is possible to reduce the temperature of the thermopile element 9, because the surrounding member 24 isolates the thermopile element 9 from the object thermally. Thereby the change in the output from the thermopile element 9 caused by the temperature around the thermopile element 9 is reduced. Further the surrounding member 24 also buffers the temperature changes in the surrounding member 24, thereby it is prevented that the thermistor in the temperature detecting device 1 does not compensate enough the output signal from the terminal 8 caused by the lower temperature response of the thermistor. Thereby the temperature detecting device 1 can precisely detect the temperature of the object.

Figure 6:
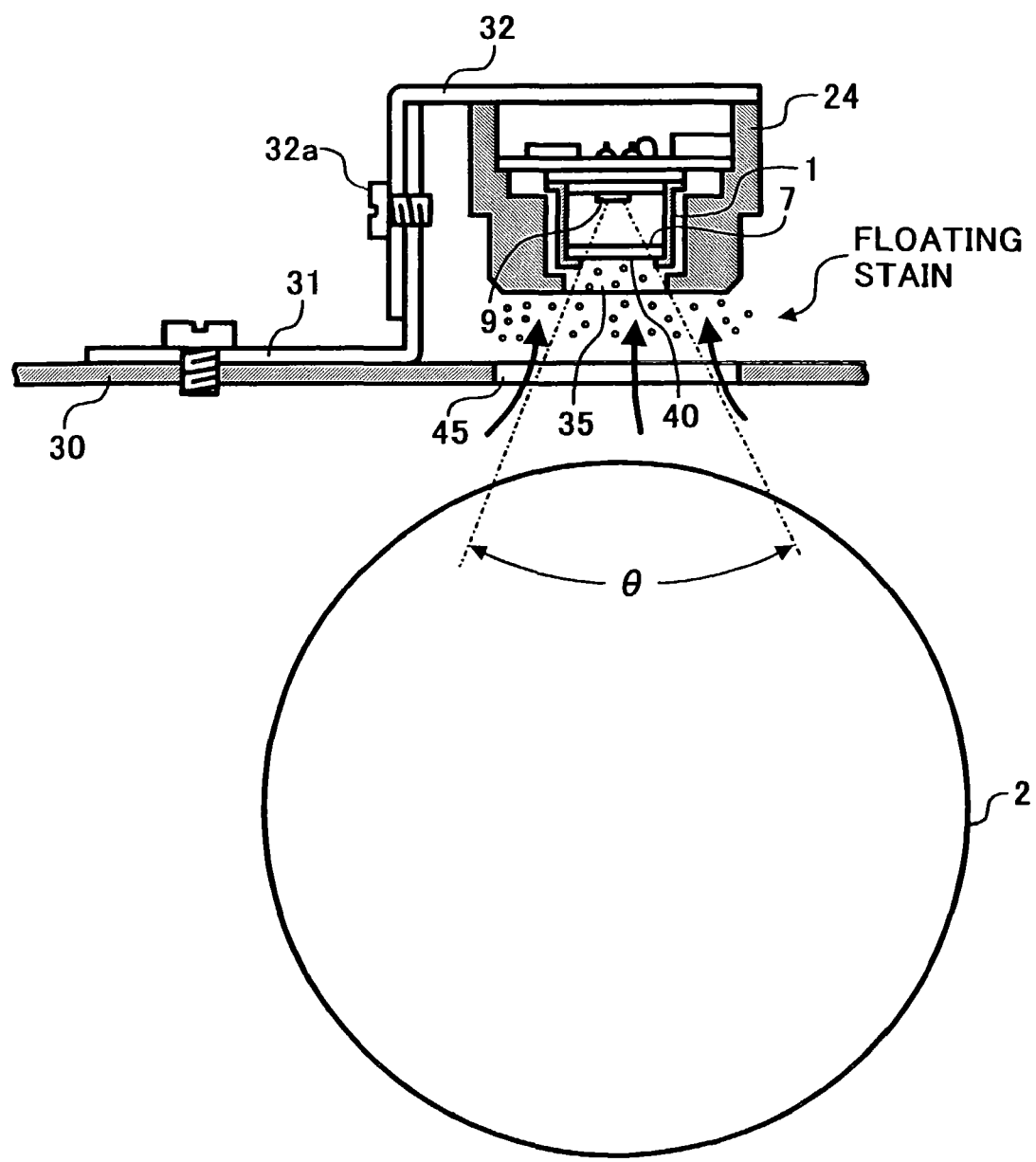
FIG. 6 is a schematic sectional view showing part of the fixing apparatus including the sensor module 21 of FIG. 4.

FIG. 6 is a schematic sectional view showing the part of the fixing apparatus in the first embodiment. The fixing apparatus includes a partition 30 arranged between the temperature detecting device 1 and the fixing roller 2 as the object, an angle plate 31 fixed to the partition 30, and an angle plate 32 fixed to the angle plate 31 by a screw 32*a*. The angle plate 32 fixes the surrounding member 24, thereby the surrounding member 24, the partition 30, the angle plate 31, and the angle plate 32 are defined as the temperature detecting unit. The partition 30 includes a frame 45 forming an opening, thereby the window member 7 directly faces both of the fixing roller 2 and the thermopile element 9. Further a holding member 35 and the frame 45 forms an opening so as not to make small the visual field angle θ where the thermopile element 9 can peculiarly detect.

In the fixing apparatus, there are toner images, silicon oil to release the toner image, and wax included in the toner image on the fixing roller 2, then they are blown by the fan or gasified by beat to become floating stain when the fixing apparatus is use.

In this embodiment, an amount of the stain on the membrane 40 is less than in a comparative example without the membrane 40 with time. Further the stain on the membrane 40 is much more easily removed by cleaning away once with a nonwoven than in the comparative example. In addition, the membrane 40 prevents stain on the window member 7 from streaking after cleaning away a few times with a nonwoven cloth as in the comparative example. Thereby it is prevented that the stain remains on the window member 7, and therefore the thermopile element 9 can more exactly detect the temperature of the object than in the comparative example. Therefore it is possible to reduce the frequency of maintenance necessary for the temperature detecting unit or the fixing apparatus.

Further the cleanliness achieved with the membrane 40 prevents the thermopile element 9 from detecting higher temperatures than real values caused by an initial thin membrane of stain that serves in a way comparable to an antireflection coating. Thereby it is prevented that the temperature on the fixing roller 2 is controlled lower than the desired temperature to compensate for the higher temperature that the thermopile element 9 detects.

In addition, it is prevented from that the thermopile element 9 detects a lower temperature than a real value caused by thickening of the membrane of the stain. Thereby it is prevented that the temperature on the fixing roller 2 is controlled higher than the desired temperature to compensate for the lower temperature that the thermopile element 9 detects. Accordingly, the present invention prevents a reduction in image quality.

Figure 7:
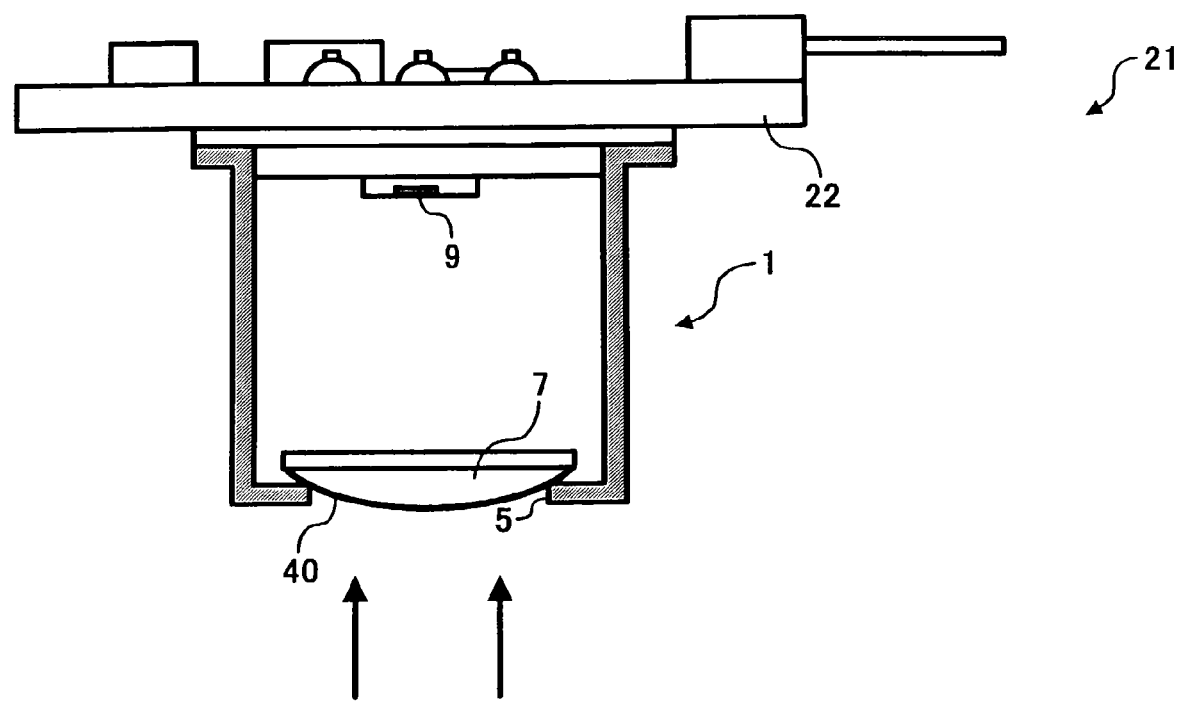
FIG. 7 is a schematic sectional view showing an alternative configuration of the sensor module 21 of the first embodiment.

FIG. 7 is a schematic sectional view showing the sensor module 21 in an alternative configuration of the first embodiment. In this configuration, the window member 7 includes a lens-shaped surface facing the object, which includes the membrane 40 with the fluorination organic. Thereby it is easy to condense the infrared rays to the thermopile element 9, then the thermopile element 9 can more exactly detect the temperature of the object.

According to the first embodiment, it is hard to stain the surface of the window member 7 with time, and it is possible to remove stain from the surface of the window member 7 easily. Further it is possible to reduce the temperature and the temperature changing in the temperature detecting unit. Thereby the thermopile element 9 can exactly detect the temperature of the object. Further it is possible to reduce the frequency of maintenance necessary for the temperature detecting unit or the fixing apparatus. In addition the invention prevents a reduction in the quality of the image. Furthermore the invention prevents the visual field angle 0 from being made small where the thermopile element 9 can precisely detect temperature.

Second Embodiment

Figure 8:
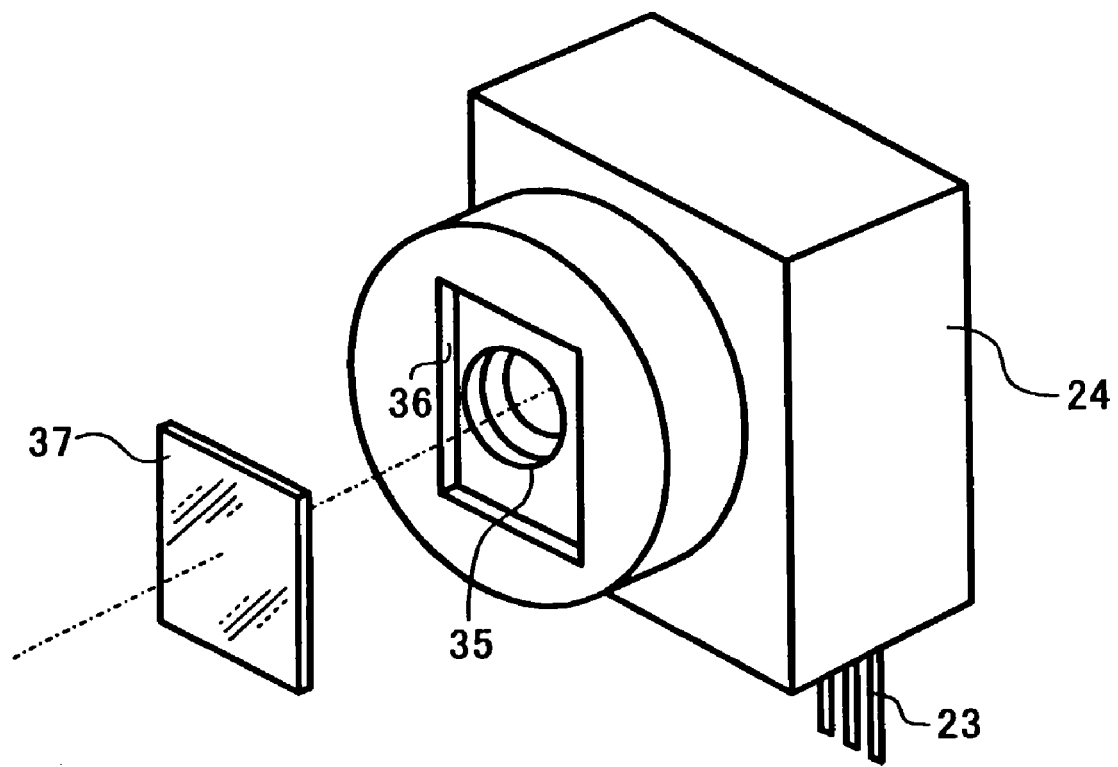
FIG. 8 is a schematic exploded perspective view showing the assembly of a window member 37 and the surrounding member 24 in the second embodiment.

FIG. 8 is a schematic exploded perspective view showing the assembly of a window member 37 and the surrounding member 24 in the second embodiment.

Figure 9:
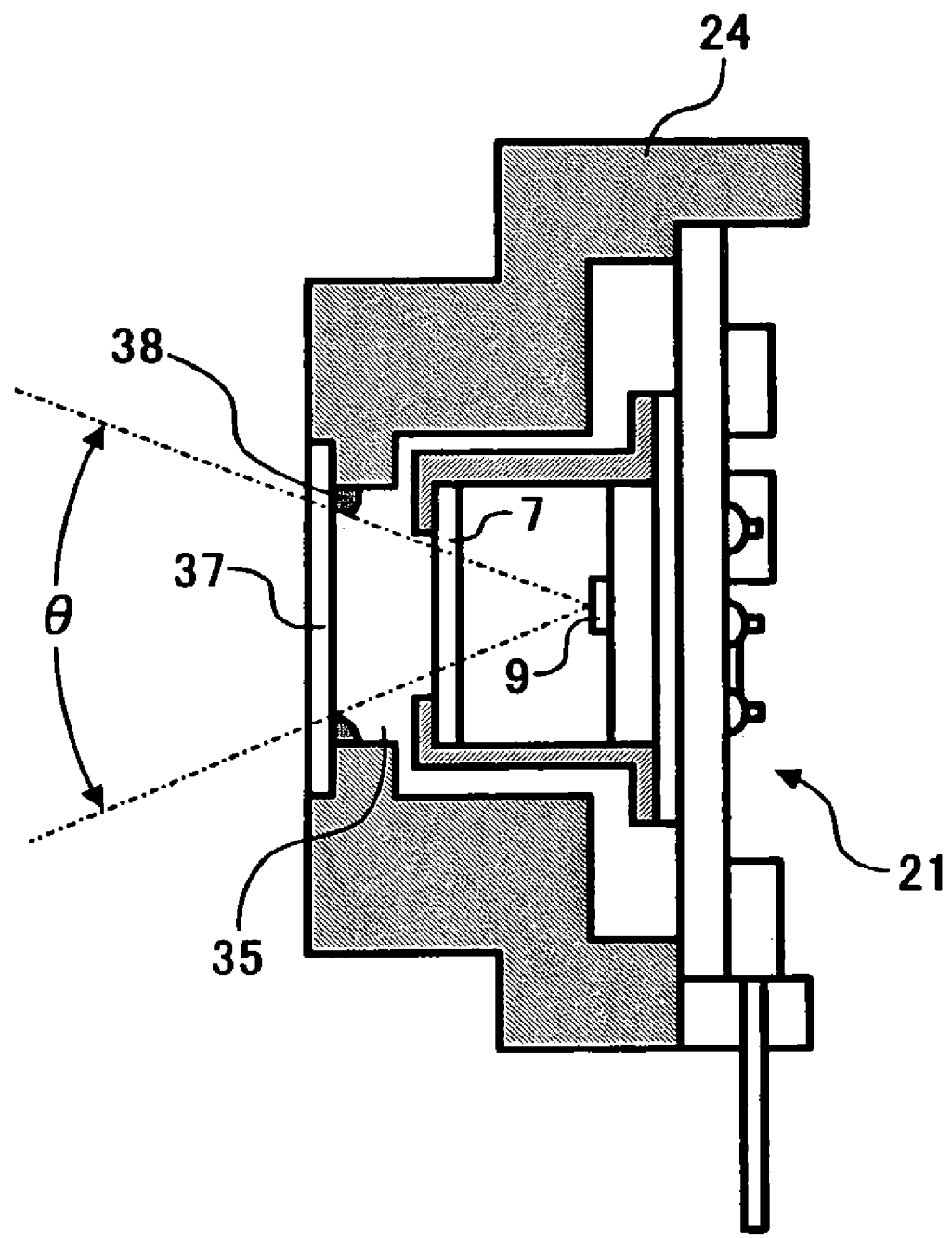
FIG. 9 is a schematic sectional view showing inside the surrounding member 24 in the second embodiment.

FIG. 9 is a schematic sectional view showing inside the surrounding member 24 in the second embodiment. A window member 37 transmits the infrared rays from the object. The window member 37 is formed by a plane silicon wafer. The window member 37 is held by the holding member 35 while fitting into a recessed seat or a level difference 36 and bonded to the surrounding member 24 by a bonding 38, thereby it is unnecessary that the membrane 40 with the fluorination organic is arranged on the surface of the window member 7. A thickness of the window member 37 is a little thinner than a depth of the level difference 36. Thereby it is prevented that the stain remains on the surface of the window member 37 after cleaning the surface of the window member 37. The thickness of the window member 37 is preferably 0.5 mm, and the infrared rays transmission efficiency is preferably 50%.

In this case, the surrounding member 24 includes the holding member 35, and the surrounding member 24 with the window member 37 is defined as the temperature detecting unit. In addition, the holding member 35 and the bonding 38 are formed so as to not make small the visual field angle where the thermopile element 9 can peculiarly detect. It is preferably to cut off the portion of the level difference 36 where the window member 37 contacts. Thereby it is possible to make small the bonding 38 that projects outwardly. Further there is preferably arranged an insulator between the can casing 6 and the opening 25, when the can casing 6 of the temperature detecting device 1 is fitted into the opening 25 as showing FIG. 5.

Figure 10:
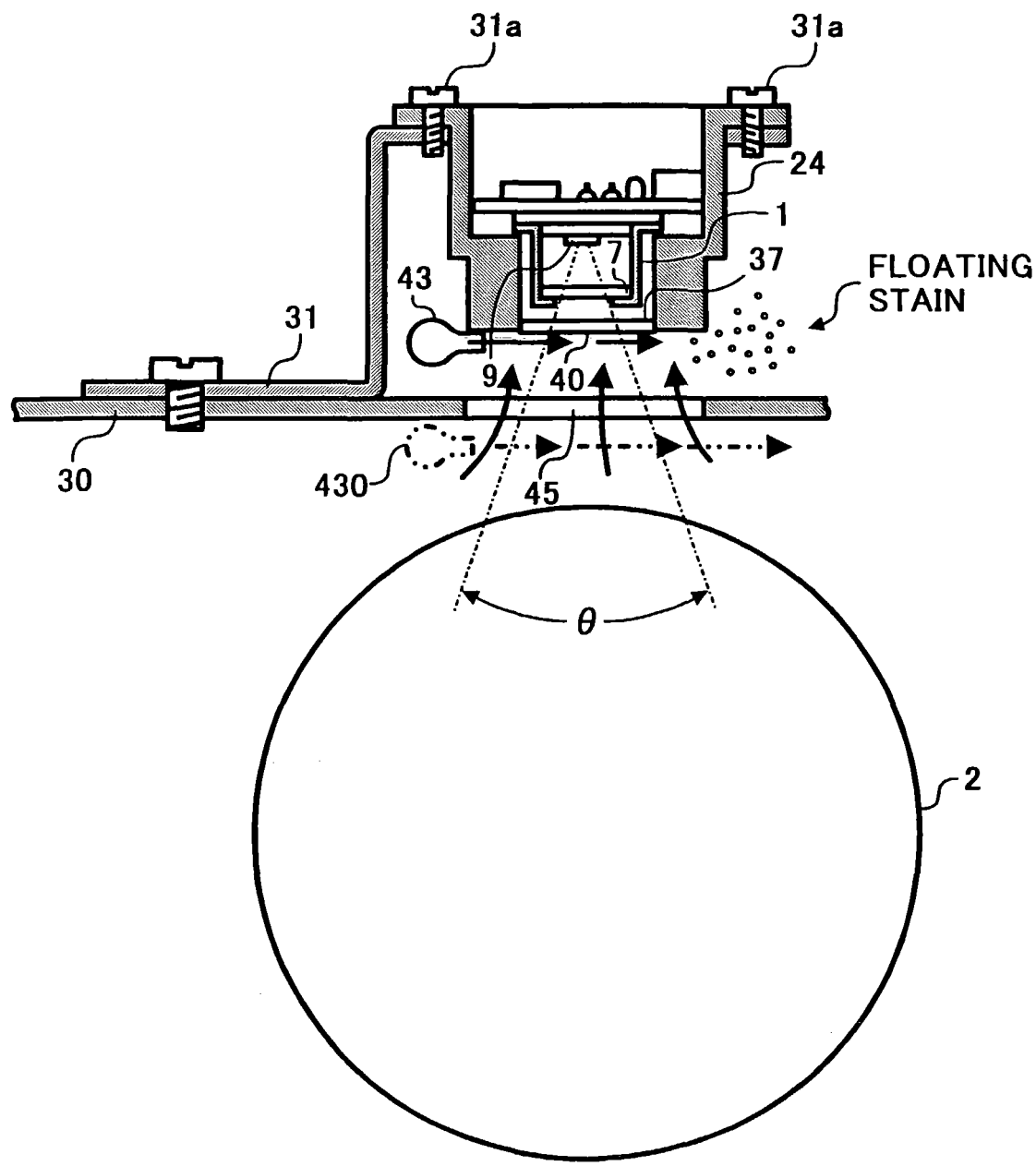
FIG. 10 is a schematic sectional view showing the part of the fixing apparatus in the second embodiment.

FIG. 10 is a schematic sectional view showing the part of the fixing apparatus in the second embodiment. In this embodiment, the surrounding member 24 is directly fixed to the angle plate 31 by screws 31a without the angle plate 32. In this case, the surrounding member 24, the partition 30, the angle plate 31 is defined as the temperature detecting unit. In addition, the window member 37 includes the membrane 40 with the fluorination organic on the side facing the fixing roller 2.

Further a ventilator 43 as an airflow arising unit or an airflow unit, which arises the airflow between the fixing roller 2 and the thermopile element 9 in a direction parallel to the surface of window member 37 as an air curtain, is arranged near the surface of the window member 37. The nozzle of the ventilator 43 is knife-edge shape, then the ventilator 43 can blow the air equally. Thereby the floating stain gasified is easily caught in a draft by the airflow, because the floating stain is a microparticle. Therefore it is harder for stain to attach to the membrane 40, as the case may be, and therefore it is unnecessary to clean the surface of the membrane 40. The ventilator 43 may use the airflow from the cooling fan in the apparatus, and may be exchangeable with a ventilator 430, which is arranged near the surface of the partition 30.

Figure 11:
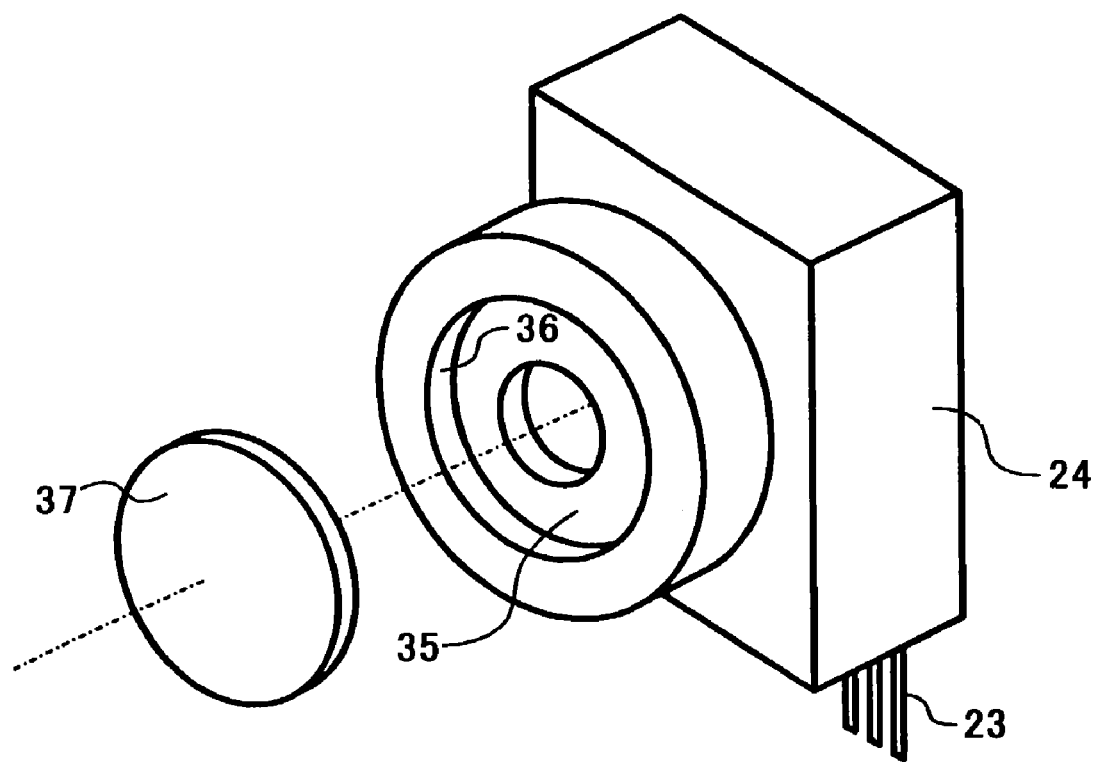
FIG. 11 is a schematic exploded perspective view showing the assembly of a window member 37 and the surrounding member 24 in an alternative configuration of the second embodiment.

FIG. 11 is a schematic exploded perspective view showing the assembly of a window member 37 and the surrounding member 24 in an alternative configuration of the second embodiment.

Figure 12:
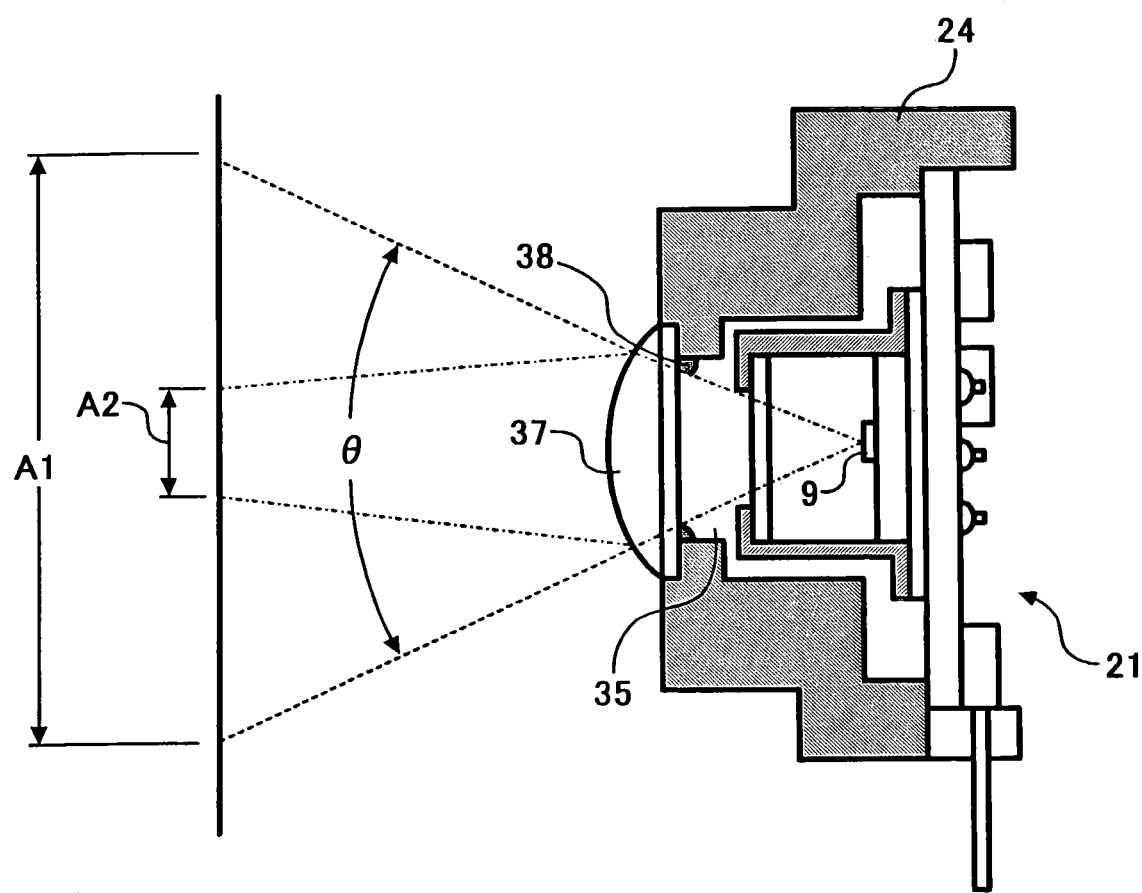
FIG. 12 is a schematic sectional view showing inside the surrounding member 24 in the alternative configuration of the second embodiment.

FIG. 12 is a schematic sectional view showing inside the surrounding member 24 in the alternative configuration of the second embodiment.

In this modification, the window member 37 includes the lens-shaped surface facing the object. The window member 37 may include the membrane 40 with the fluorination organic as in FIG. 10. Thereby it is easy to condense the infrared rays to the thermopile element 9 as showing A2 (A1 is the visual field in case of the plane shape). Therefore the thermopile element 9 can more exactly detect the temperature of the object, then this is preferable when the thermopile element 9 detects the temperature of a food cooked by an electric heating cooking device.

According to the second embodiment, the stain is prevented from remaining on the surface of the window member 37 after cleaning the surface of the window member 37. In addition, it is harder to stain the membrane 40, as the case may be, and thus it is unnecessary to clean the surface of the membrane 40.

Third Embodiment

Figure 13:
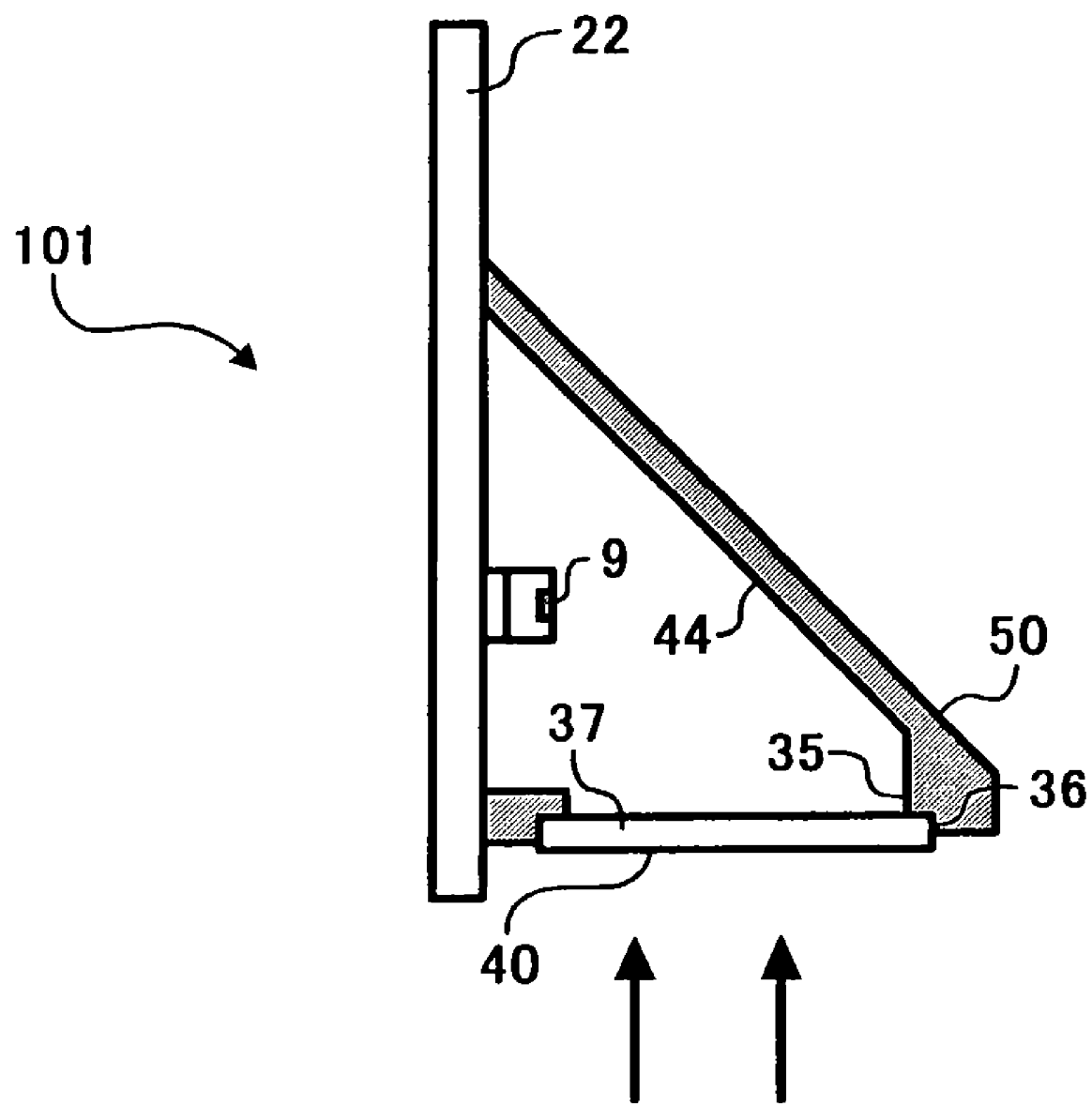
FIG. 13 is a schematic sectional view showing a sensor module 101 in the third embodiment.

FIG. 13 is a schematic sectional view showing a sensor module 101 of a third embodiment. A sensor module 101 includes the printed circuit board 22 fixing the thermopile element 9 inside there, a surrounding member 50 including the holding member 35 and the level difference 36, and the window member 37. A reflecting mirror 44 is formed inside of the surrounding member 50, which reflects the infrared rays. The window member 37 includes the membrane 40 with the fluorination organic on the side facing the object thereof, which is held by the holding member 35 while fitting into the level difference 36 as in FIG. 8 and FIG. 9. In this case, the sensor module 101 is defined as the temperature detecting unit. The sensor module 101 forms an almost right isosceles triangle whose hypotenuse is the reflecting mirror 44. Thereby the reflecting mirror 44 reflects the infrared rays transmitting the window member 37 toward the thermopile element 9, then the thermopile element 9 receives the infrared rays. The surface of the reflecting mirror 44 may be formed by sphericity. The reflecting mirror 44 may be formed by a multiple layer that reflects only the infrared rays. Further the window member 37 may include the lens-shaped surface facing the object.

Figure 14:
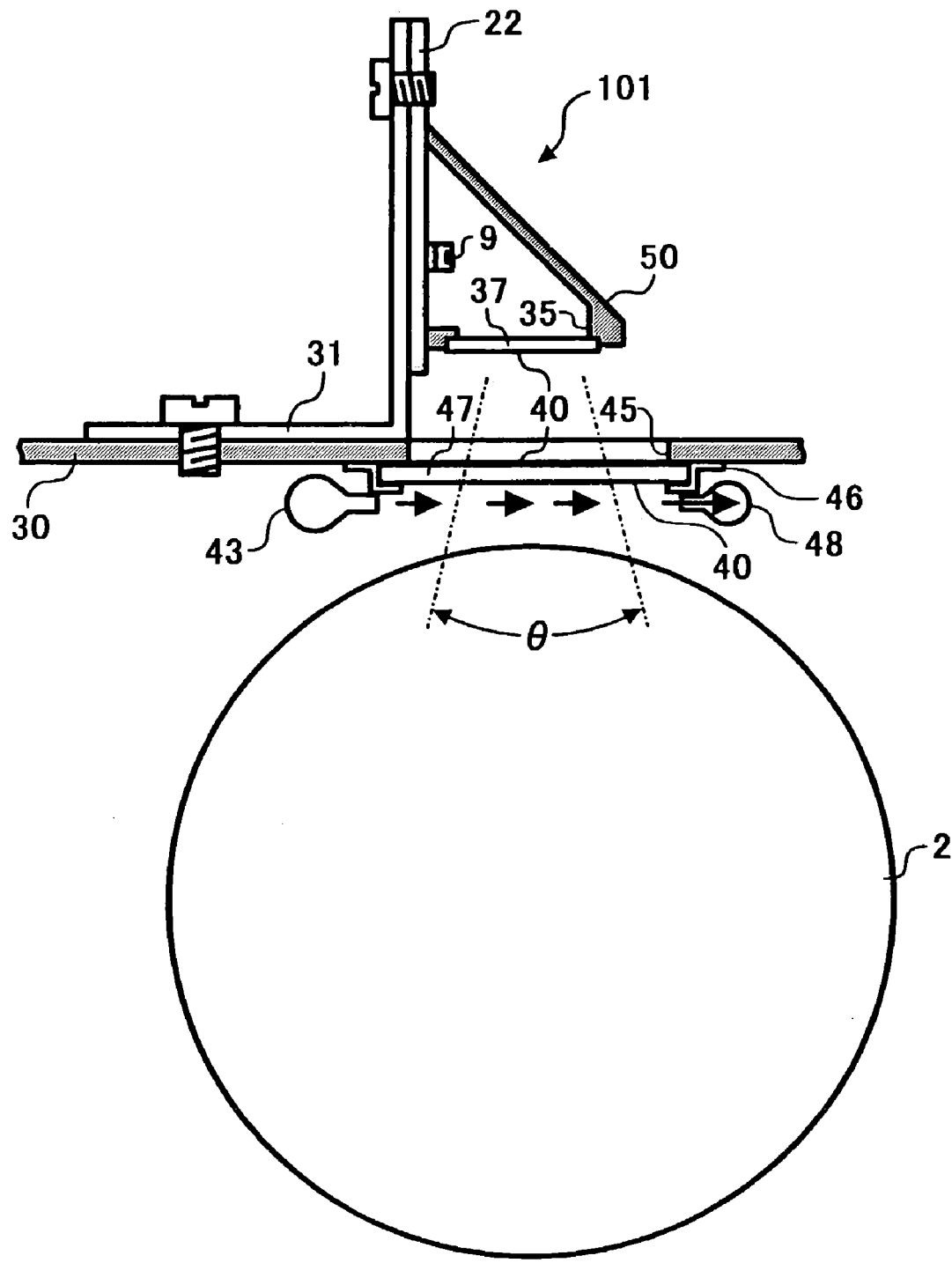
FIG. 14 is a schematic sectional view showing the part of the fixing apparatus in the third embodiment.

FIG. 14 is a schematic sectional view showing the part of the fixing apparatus in the third embodiment. In this embodiment, the printed circuit board 22 is fixed to the angle plate 31, thereby the sensor module 101 is fixed to the angle plate 31. In this case, the sensor module 101, the angle plate 31 and the partition 30 are defined as the temperature detecting unit. Further the partition 30 includes a frame 45 forming an opening. The frame 45 and a supporting member 46 with elasticity presses and holds a window member 47 which is arranged between the fixing roller 2 and the thermopile element 9, after the window member 47 slides into position between the frame 45 and the supporting member 46. The frame 45 transmits the infrared rays and which includes the membrane 40 with the fluorination organic on the side facing the fixing roller 2 and on the side facing the thermopile element 9.

In this case, the window member 37 is defined as a second window member, which is arranged between the frame 45 and the thermopile element 9, and which includes the surface facing the fixing roller 2 with a fluorination organic compound. Further the holding member 35 is defined as a second frame which holds the second window member. Thereby the membrane 40 on the window member 47 definitely faces the fixing roller 2 in case that inside and out of the window member 47 is opposite after the detached window member 47 is attached to the frame 45 again. The window member 47 with the membrane 40 on both sides is preferably used to detect the temperature of air in the room in the air conditioner, because it is easy to stain both sides of the window member 47 in the air conditioner. In addition, the window member 37 is prevented from being stained much when the window member 47 is detached from the frame 45, because the membrane 40 is also on the window member 37.

Further the ventilator 43 and a suction member 48 are defined as an airflow arising unit, which provide airflow between the fixing roller 2 and the thermopile element 9 in a direction parallel to the surface of window member 47, and which is arranged near the surface of the window member 47. The ventilator 43 sends air, and the suction member 48, which is arranged with the window member 47 between the ventilator 43 and the suction member 48 sucks the air. Thereby the airflow in the direction parallel to the surface of window member 47 stabilizes. The suction member 48 may use the negative pressure caused by the cooling fan in the apparatus. Then a filter (not illustrated) may remove the stain in the air sucked by the suction member 48, and then the air is discharged to the outside the apparatus or is received in the apparatus.

Figure 15:
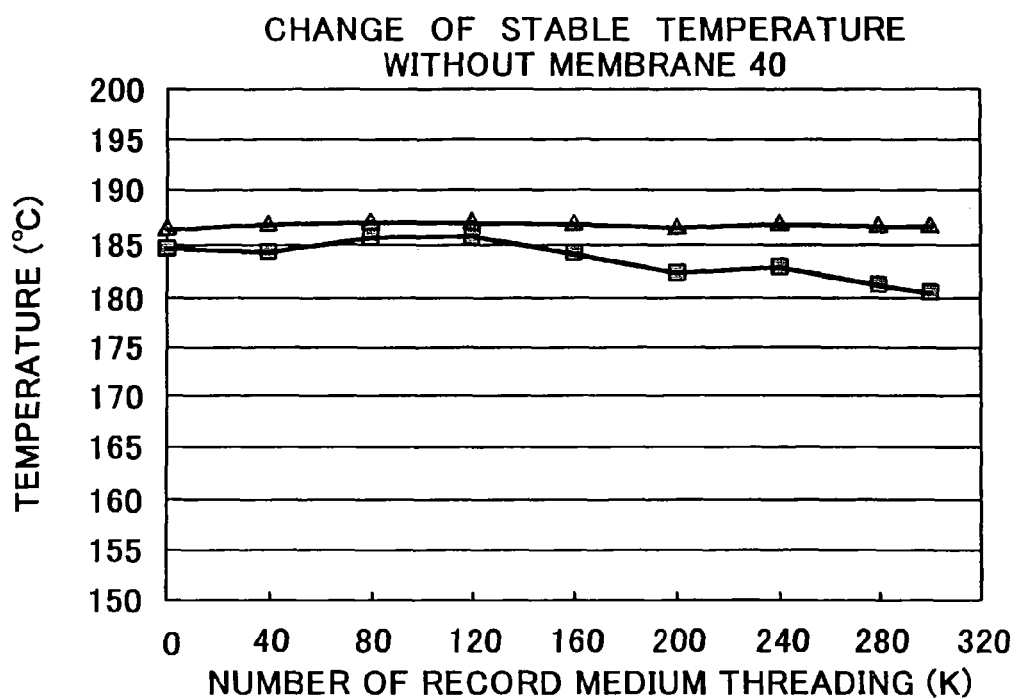
FIG. 15 is a view showing the relation between the number of the record medium threading and the stable temperature on the fixing roller 2 that is detected by the sensor module 101 without the membrane 40 on the window member 47 in the third embodiment.

FIG. 15 is a view showing the relation between the number of the record medium threadings (in thousands, K) and the stable temperature on the fixing roller 2 that is detected by the sensor module 101 without the membrane 40 on the window member 47 in the third embodiment.

Figure 16:
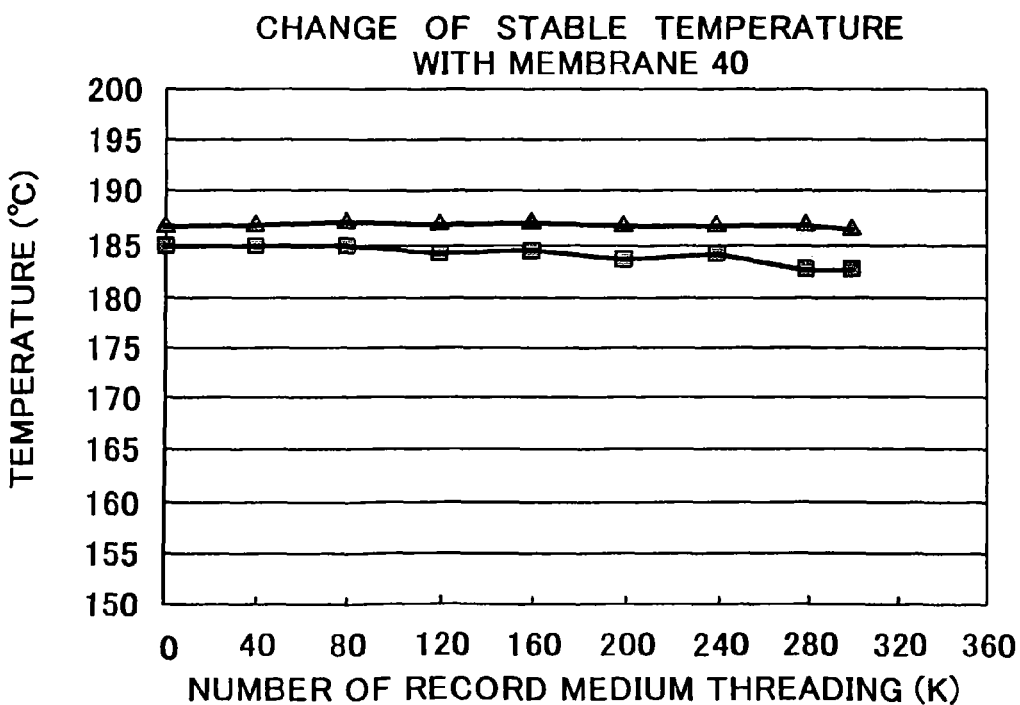
FIG. 16 is a view showing the relation between the number of the record medium threading and the stable temperature on the fixing roller 2 that is detected by the sensor module 101 with the membrane 40 on the window member 47 in the third embodiment.

FIG. 16 is a view showing the relation between the number of the record medium threadings (in thousands, K) and the stable temperature on the fixing roller 2 that is detected by the sensor module 101 with the membrane 40 on the window member 47 in the third embodiment.

The experiment was held in the condition that there was no ventilator 43, no suction member 48 and no window member 47, and that the OPTOOL DSX produced by DAIKIN INDUSTRIES, LTD formed the membrane 40 on the window member 37. The thickness of the membrane 40 was 1 μm, and the contact angle of water on the membrane 40 was 105 degree, and the friction coefficient on the membrane 40 was 0.15.

The experiment was held in the fixing apparatus of the copier in the condition that the record medium continuously threaded, and the toner image forming the text pattern was fixed on the record medium as occupying 60% area of the record medium, and the desired temperature on the fixing roller 2 was 187° C. The 300,000 th record medium threading is the desired value at which periodical maintenance is performed in the field.

In FIG. 15 and FIG. 16, the black triangle shows the temperature detected by the thermopile element 9, and the black square shows the temperature detected by the temperature sensor contacting on the fixing roller 2 as a real temperature. In both of FIG. 15 and FIG. 16, the temperatures detected by the thermopile element 9 stabilize near 187° C. with time, however the differences between the real temperature and the temperature detected by the thermopile element 9 increase with time caused by the stain on the window member 37.

The temperature difference is about 2.5° C. in FIG. 16, but the difference temperature is about 5.5° C. in FIG. 15 after 300,000 of the record medium threadings. In the fixing apparatus, the temperature difference within 2.5 □ is no problem. In other words, it is hard to stain the surface of the window member 37 with time, thus the thermopile element 9 can exactly detect the temperature of the fixing roller 2 in FIG. 16. Further in this experiment, the stain on the membrane 40 is easily cleaned away with alcohol. These results can be achieved using the DEMNUM Grease produced by DAIKIN INDUSTRIES, LTD instead of the OPTOOL DSX.

According to the third embodiment, it is hard to stain the surface of the window member 37 with time, and it is possible to remove stain from the surface of the window member 37 easily. Thereby the thermopile element 9 can exactly detect the temperature of the fixing roller 2. Further it is possible to reduce the frequency of performing maintenance on the temperature detecting unit or the fixing apparatus.

Regarding All Embodiments Described Above

Figure 17:
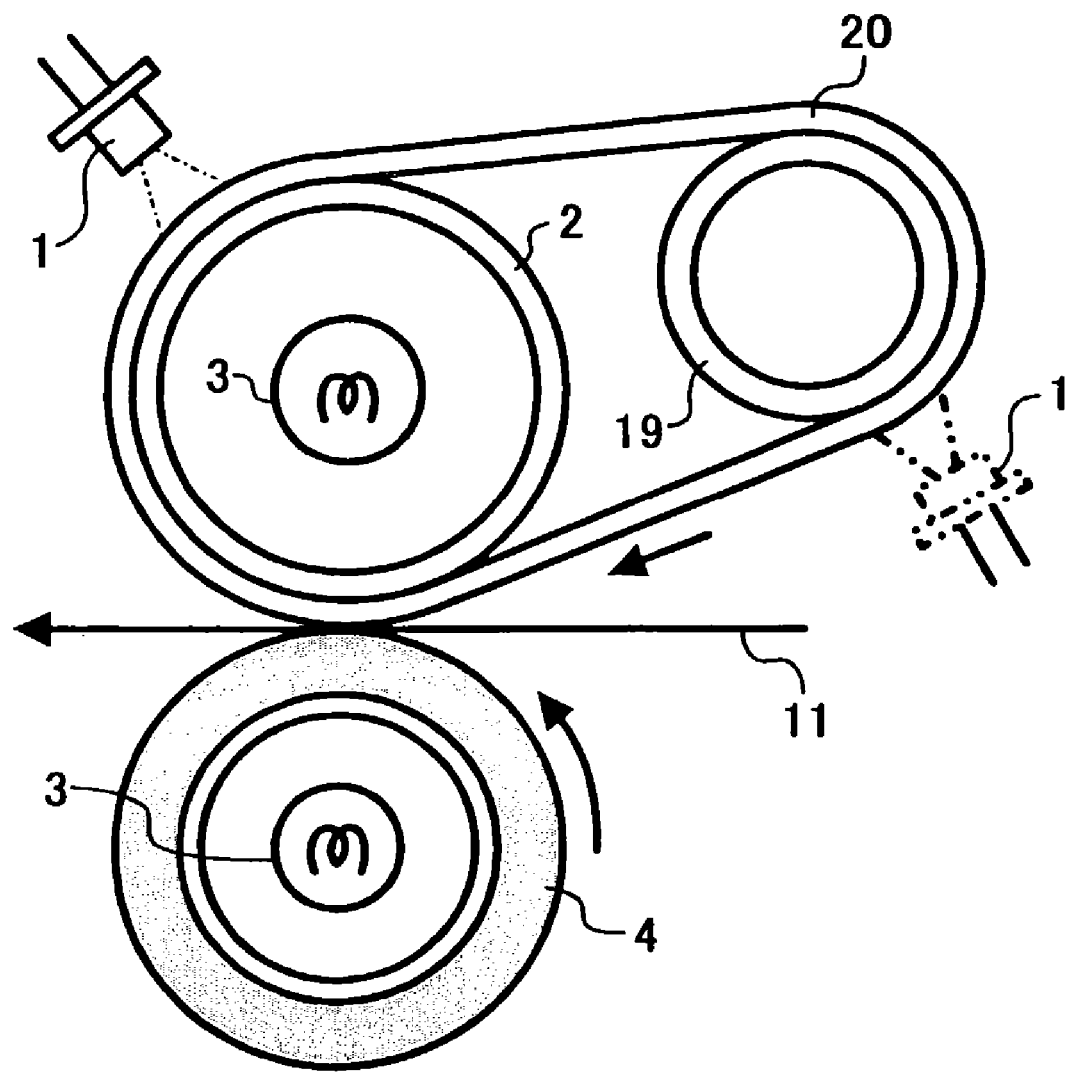
FIG. 17 is a schematic front view showing a fixing apparatus in an image forming apparatus incorporating any of the embodiments described above.

FIG. 17 is a schematic front view showing a fixing apparatus in an image forming apparatus for use with all embodiments described above. The fixing roller 2 and a tension roller 19 support a fixing belt 20 as a fixing member and the object, the thermopile element 9 detects the temperature on the surface of the fixing belt 20. The thermopile element 9 may be arranged below the fixing member and upstream near the nip as shown by the dotted lines. Thereby the thermopile element 9 can exactly detect the temperature on the fixing belt 20 without the influence of the convective heat.

Further the object may be a food cooked by an electric heating cooking device or air in a room whose temperature is regulated by an air conditioner instead of the fixing member.

The present application claims foreign priority to 2002–205840, which is incorporated by reference herein in its entirety.

What is claimed is:

1. A temperature detecting unit comprising:
   a temperature detecting sensor which receives infrared rays radiated by an object, thereby detecting the temperature of said object without contact with said object;
   a window member, which is arranged between said object and said temperature detecting sensor, and which transmits the infrared rays;
   a frame which holds said window member; and
   a second window member, which is arranged between said window member and said temperature detecting sensor, and which transmits the infrared rays,
   wherein said window member includes a surface with a fluorination organic compound, and
   wherein said second window member includes a surface with a fluorination organic compound.

2. The temperature detecting unit according to claim 1, wherein said surface faces said object.

3. The temperature detecting unit according to claim 1, wherein said surface faces said temperature detecting sensor.

4. The temperature detecting unit according to claim 1, wherein said surface includes a membrane with the fluorination organic compound.

5. The temperature detecting unit according to claim 4, wherein said membrane is formed by coating a fluorocarbon resin thereon.

6. The temperature detecting unit according to claim 4, wherein said membrane is formed by spreading oil with fluorine.

7. The temperature detecting unit according to claim 1, wherein said window directly faces said temperature detecting sensor.

8. The temperature detecting unit according to claim 1, wherein said window directly faces said object.

9. The temperature detecting unit according to claim 8, wherein said window includes a plane surface facing said object.

10. The temperature detecting unit according to claim 8, wherein said window includes a lens-shaped surface facing said object.

11. The temperature detecting unit according to claim 1, further comprising a surrounding member which surrounds said temperature detecting sensor.

12. The temperature detecting unit according to claim 11, said surrounding member includes said frame.

13. The temperature detecting unit according to claim 1, further comprising a partition arranged between said object and said temperature detecting sensor.

14. The temperature detecting unit according to claim 13, wherein said partition includes said frame.

15. The temperature detecting unit according to claim 1, further comprising:

a second frame which holds said second window member.

16. The temperature detecting unit according to claim 1, wherein said object is a fixing member which heats a toner image and thereby fixes said toner image on a record/medium.

17. The temperature detecting unit according to claim 16, wherein said fixing member is a fixing roller.

18. The temperature detecting unit according to claim 16, wherein said fixing member is a fixing belt.

19. The temperature detecting unit according to claim 1, wherein said object is food cooked by an electric heating cooking device.

20. The temperature detecting unit according to claim 1, wherein said object is air in a room whose temperature is regulated by an air conditioner.

* * * * *